J. F. GALLAGHER.
APPARATUS FOR REGULATING TEMPERATURE.
APPLICATION FILED JAN. 19, 1914.
1,149,818.
Patented Aug. 10, 1915.
3 SHEETS—SHEET 1.
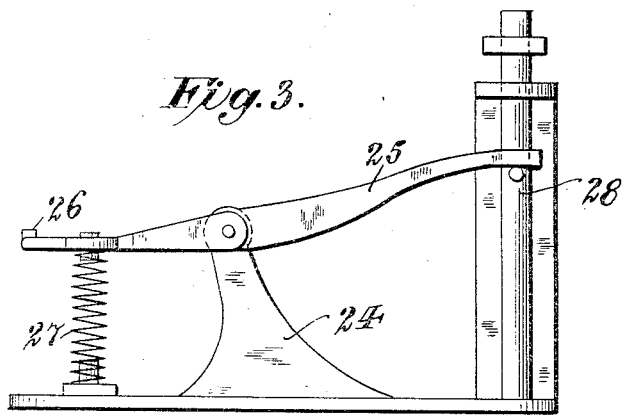
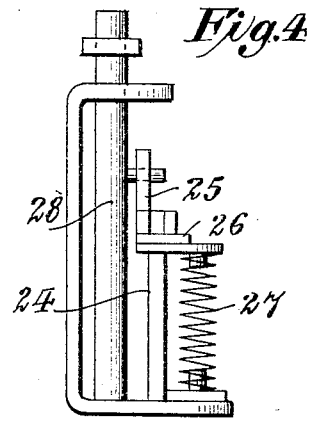
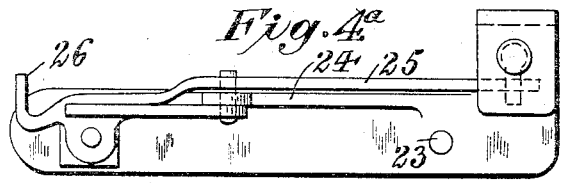
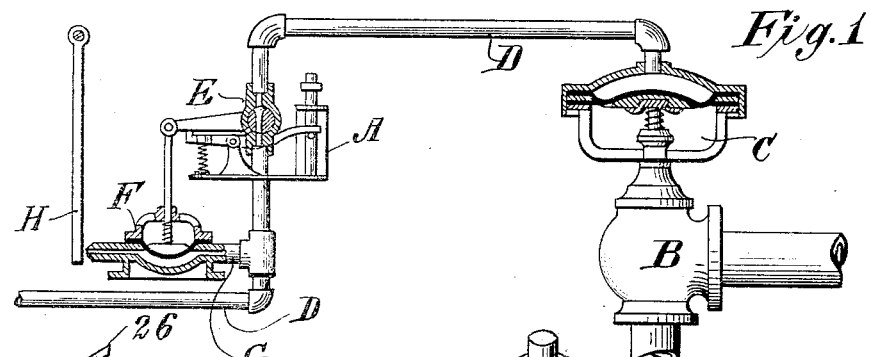
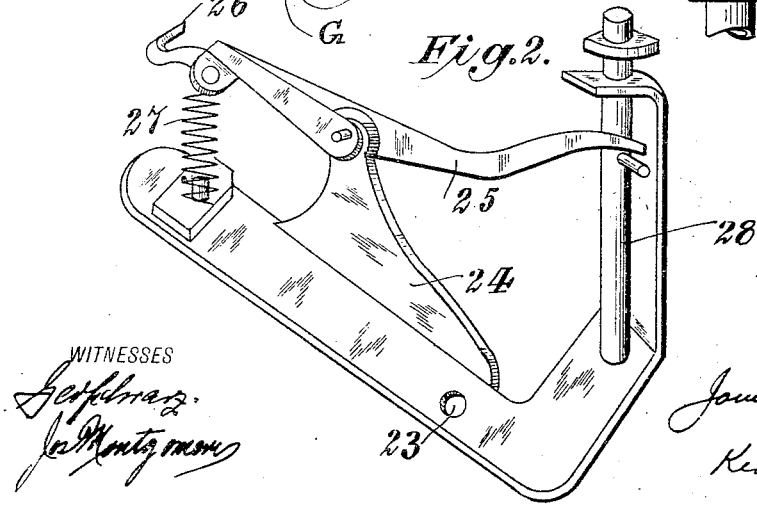
WITNESSES
INVENTOR
James F. Gallagher
BY
Kiddle Theargeson
HIS ATTORNEYS J. F. GALLAGHER.
APPARATUS FOR REGULATING TEMPERATURE.
APPLICATION FILED JAN. 19, 1914.
1,149,818.
Patented Aug. 10, 1915.
3 SHEETS—SHEET 2.
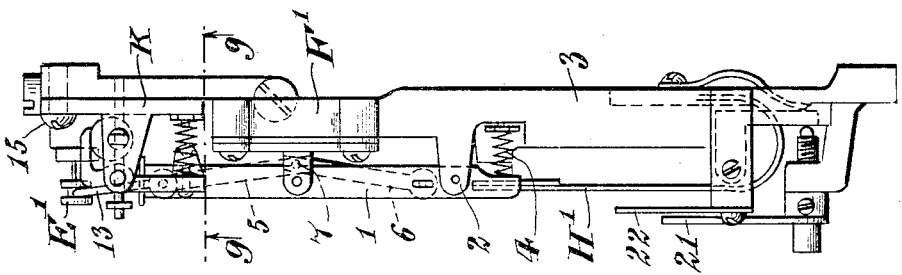
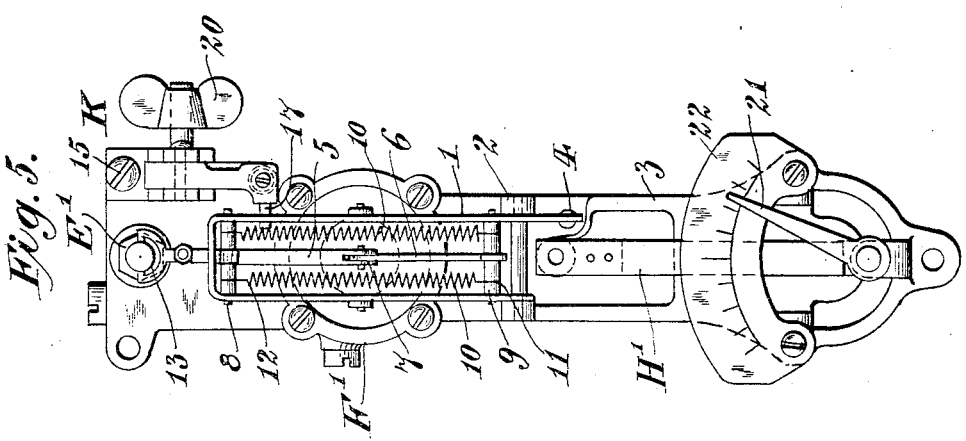
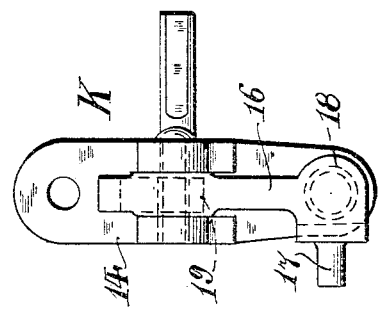
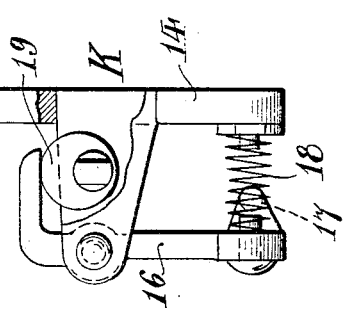
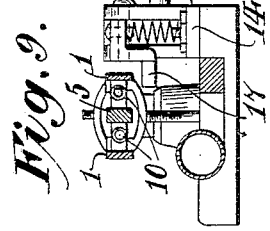
WITNESSES:
INVENTOR
James F. Gallagher
BY
Kiddle Thargison
HIS ATTORNEYS

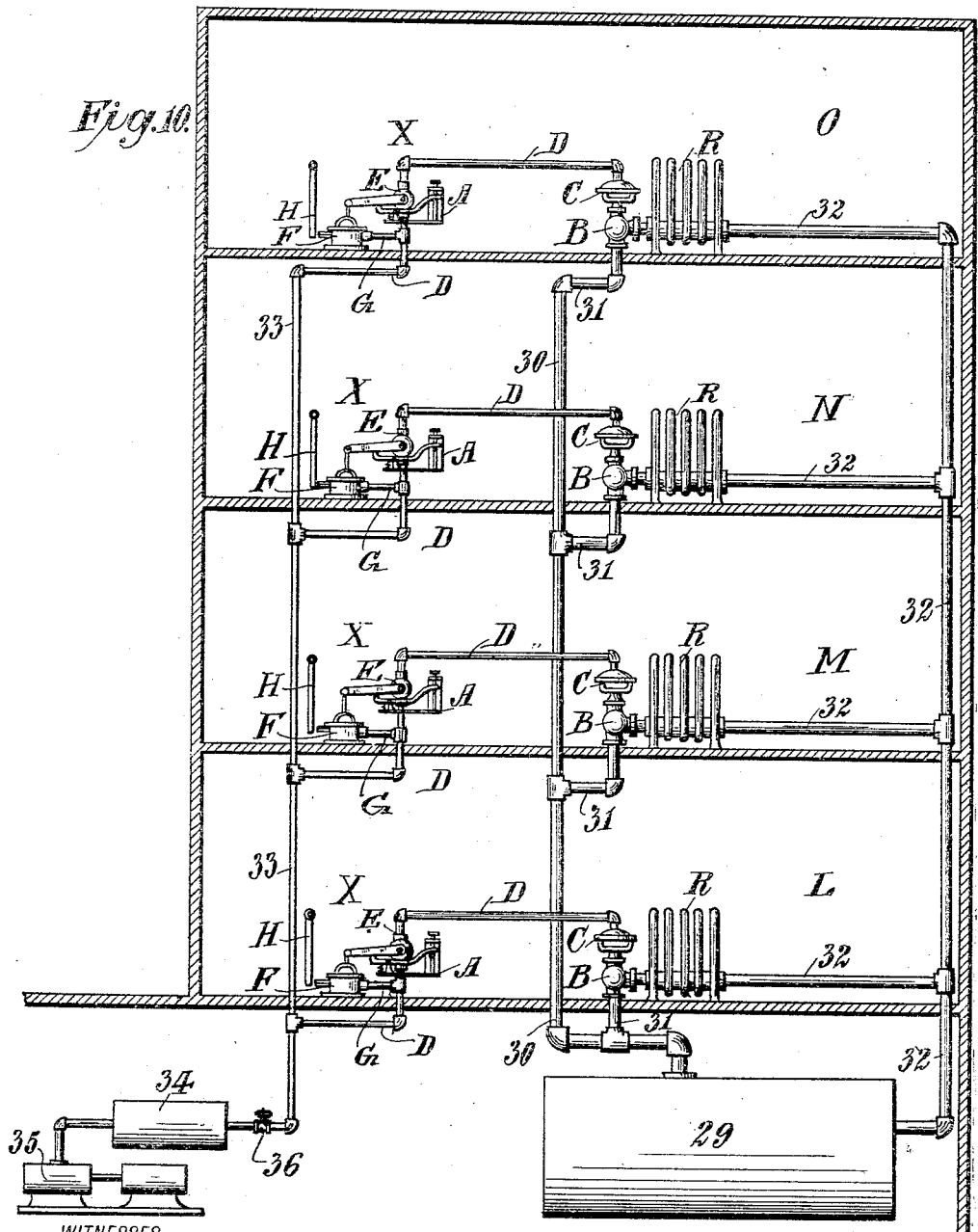

UNITED STATES PATENT OFFICE.

JAMES F. GALLAGHER, OF NEW YORK, N. Y., ASSIGNOR OF ONE-HALF TO PETER J. LAVELLE, OF NEW YORK, N. Y.

APPARATUS FOR REGULATING TEMPERATURE.

1,149,818.

Specification of Letters Patent.

Patented Aug. 10, 1915.

Application filed January 19, 1914. Serial No. 812,952.

*To all whom it may concern:*

Be it known that I, JAMES F. GALLAGHER, a citizen of the United States of America, residing in the borough of Brooklyn of the city of New York, county of Kings, and State of New York, have invented certain new and useful Improvements in Apparatus for Regulating Temperature, of which the following is a specification.

Several different types of apparatus are at present in use for automatically controlling the supply of a heating medium, such as steam or hot water, to a radiating member whereby when the heat of the room in which the radiator is located reaches a predetermined temperature, the flow of the heating medium will be diminished or else entirely shut off, and whereby when the temperature of the room falls below a predetermined temperature, the heating medium will be either supplied to the radiator, should it have been previously cut off, or else the supply of the heating medium will be increased in quantity if some were being supplied at that time. An apparatus for accomplishing this purpose is shown in the patent to Johnson No. 733,210. In the construction shown in said patent the temperature of the room is indirectly dependent upon the position of an indicator arm that is positioned over and in reference to a marked dial. In such a construction the flow of the heating medium to the radiator is controlled by a primary valve that is directly connected to a primary valve motor. This motor is connected to a separate source of fluid supply such as air under pressure, and the flow of operating air to the primary valve motor is controlled by a secondary valve that is in turn connected to an air-operated secondary-valve motor whose operation is controlled by a thermostatic sensitive member, often referred to as a thermostatic valve. This thermostatic valve is dependent for its operation upon the position of the indicator arm which is positioned over the marked dial. The device comprising this thermostatic valve and dial is known in the trade as a thermostat and its adjustment is quite delicate. For this reason, when the thermostat has been once set to maintain the proper normal temperature of the room, when it is to be occupied, it is desirable not to move the indicator arm for such purposes as cutting off or diminishing the supply of heating medium to the radiator when the room is not to be occupied.

When the temperature of the room rises as high as is normally required the thermostatic valve therein, as H, opens, thus permitting a spring, as 23, of the secondary valve motor, as F, to cause the secondary valve, as E, to open whereby air pressure can be supplied to the primary motor in order to close the primary valve, as B. The pressure of the air for operating the motors is usually maintained constant and uniform as for example at fifteen pounds. At night, however, in such buildings as school-houses or the like, in order to save fuel it is desirable to shut off the heat from all rooms except as may be desired to be occupied.

According to my invention the pressure of the air supply to the motors is dropped for instance fifty per cent. during the night and then, since there is not enough power to operate the secondary valve motor, the secondary valve will remain open due to the motor spring, as 23, regardless of whether or not the thermostatic valve, as H, is open or closed. At such time as it may be desired to heat to a uniform temperature some particular room or rooms, this can be effected by bringing into operation a device or attachment which will be subsequently described. One form of the device or attachment is marked A in Figure 1 and another form is indicated by the reference character K in Figs. 5 and 6. The function and operation of the devices or attachments marked A and K are similar and either of these attachments may be used to assist the secondary valve motor in closing the secondary valve when the pressure of the air supplied to the primary valve motor and secondary valve motor has been decreased. When the air supplied to the primary motor has been cut off by the closing of the secondary valve a spring, as 24, in the primary valve motor can operate to open the primary valve.

It will be noted that the air pressure in the system even when reduced should be sufficient so that when the secondary valve E is opened the primary motor will operate to close the primary valve.

As showing certain specific embodiments of the invention reference is made to the drawings forming a part of this specification, and in which drawings, Fig. 1 is a diagrammatic view illustrating a system for regulating the temperature of a room, one form of the device or attachment which enables the present invention to be realized being indicated thereon by the reference character A. Fig. 2 is a perspective view of the device or attachment indicated by the reference character A in Fig. 1. Figs. 3, 4 and 4ª are respectively a side elevation, end elevation and plan view of the device A. Figs. 5 and 6 are front and side elevations of a thermostat to which there is secured the device or attachment K which corresponds in its function and mode of operation to the device or attachment A illustrated in Fig. 1. Fig. 7 is an enlarged side elevation partially broken away of the device K. Fig. 8 is a front elevation of the device K. Fig. 9 is a sectional view, looking upwardly in the direction of the arrows, taken on the line 9—9 of Fig. 6. Fig. 10 illustrates a heating system embodying my invention.

In Fig. 1, B indicates a primary valve which controls the flow of the heating medium to the radiator; C a motor for operating the primary valve; D a compressed air supply for the primary motor; E a secondary valve for controlling said supply; F a motor connected to the secondary valve for operating the same; G a compressed air supply for the secondary motor; and H a thermostatic sensitive member or valve for controlling the secondary motor F. As all of this particular construction in Fig. 1, with the exception of the structure indicated by A, is well known in the art, it is believed that further description relative thereto is unnecessary at this time.

In the thermostat illustrated in Figs. 5 and 6, H' indicates a thermostatic sensitive valve (corresponding to the valve H shown in Fig. 1) for controlling the secondary valve motor F' (which corresponds to the motor F in Fig. 1). Motor F' operates the toggle mechanism which is connected to the secondary valve E' for controlling the operation of a primary valve motor. This valve E' corresponds to the valve E shown in Fig. 1. The mechanism for operating the secondary valve E' from the motor F' comprises a swinging yoke or frame 1 which is pivoted to ears 2 which are on the thermostatic main frame or backing 3. This swinging yoke is pressed by the compression spring 4 so that its upper end tends to swing toward the main frame or backing 3. The toggle mechanism previously referred to comprises the upper toggle member 5 and the lower toggle member 6 which are pivotally connected together at 7 and which are also pivotally connected respectively to the upper and lower portions of the swinging frame at the points 8 and 9. Small tension springs indicated at 10 are connected at 11 and 12 indirectly to the toggle members so as to tend to retain the toggle members in the position indicated in Fig. 6. The upper toggle member has at its upper free end the yoke 13 having knobs that enter the circumferential grooved portion of the valve E'.

In the upper right hand portion of Fig. 5 there is indicated the device or attachment K which is shown more in detail in Figs. 7 and 8. This device comprises a body member 14 which can be secured in place on the main frame or backing by any suitable means such as the screw 15. There is pivotally mounted upon said body member the upright lever 16, one end of which is provided with a laterally extending lug 17 that extends behind the upper free end of the swinging yoke 1. Between the body 14 and said lever there is located a compression spring 18 arranged so as to tend to force the lug outwardly against the yoke. In other words the spring tends to force the upper free end of the yoke away from the main frame or backing 3 so as to open the secondary valve E'. There is also mounted upon the body member 14 a locking or holding member which preferably comprises a cam, as 19, arranged so as to force the lever against the compression of the spring and to hold the lever in this position when desired. The movement imparted to the lever by this locking or controlling cam is sufficient to withdraw the lug 17 from contact with the yoke thus permitting the thermostat to operate in the same manner as if the device or attachment were not secured in place upon the main frame or backing 3.

As above indicated, it is often desirable to cut off the supply of heat to the several rooms in a building during certain periods and this can be accomplished by decreasing the pressure of air supplied to the valve motors and particularly that which is supplied to the secondary valve motor. This pressure, however, should be sufficient to cause the primary motor to close the primary valve when the secondary valve is open. In order to assist the secondary valve motor to open the secondary valve, the device or attachment A, or the device or attachment K is provided, which, when allowed to operate, presses against a movable member operatively connected to the secondary valve in a direction tending to open said secondary valve.

The device or attachment K can be brought into operation by turning the cam 19 by means of the thumb member 20, so that the cam will not engage or lock the lever 16, then the spring will force the lug 17 against the yoke and thus assist the motor F' in moving the secondary valve E'. In other words, when the spring is thus forcing the lug against the yoke the secondary valve motor F' will be operated by air under a lesser pressure than would be the case if the attachment K were not utilized. It will therefore be noted that with the lug 17 pressing against the yoke the temperature of the room can be maintained even when the air pressure supplied to the secondary valve has been materially reduced.

In Figs. 2, 3, 4 and 4ª there is clearly illustrated the form A which may be secured to the main frame or backing 3 by the screw 15 being passed through the opening 23. In this form 24 is the body member, 25 is the pivoted lever, 26 is the lug that extends behind the yoke, 27 is the compression spring, and 28 is the locking member which engages the free end of the lever to hold the latter in position where the lug 26 cannot press against the yoke. This device which is indicated by A in Fig. 2 is the same in its function and mode of operation as the form of device indicated by K.

In Fig. 10 a system is illustrated for heating the several rooms of a building. These rooms are indicated by the reference characters L, M, N and O, and in each room there is located and included as a part of the heating system the arrangement shown in Fig. 1, it being understood that the thermostat which controls the operation of the motor C connected to the primary valve B may be the same as that shown in Figs. 5 and 6.

In both Figs. 1 and 10 the same reference character denotes the same part.

The boiler or heater shown in Fig. 10 is indicated by 29. This supplies the heating medium to the radiators R by means of the main supply pipe 30 and the several branches 31. A return pipe 32 from each of the radiators connects the latter to the boiler. The flow of heating medium, be it steam or water, through each of the branch pipes 31 is controlled by the primary valve B that is connected to and operated by the primary valve motors C. The thermostat which comprises the secondary valve such as E, the secondary valve motor, such as F, the sensitive thermostat valve such as H, and the device or attachment A shown in Fig. 1 or K in Figs. 5 and 6, is designated as X. This thermostat is located in each room and a commercial embodiment of said thermostat is illustrated in Figs. 5 and 6. Each of the primary valve motors C and the secondary valve motors F are supplied with air by means of the branch pipes D and C that lead from the main air supply pipe 33 connected to the compressed air storage tank 34. The air is supplied to the storage tank 34 by any suitable air pumping means as 35. In the main air supply pipe 33 there is also included a reducing valve 36 whereby the air delivered through the main air supply pipe 33 will be of any pressure desired.

In the normal operation of the system, as during the day time, air is supplied through the main air supply pipe, at for instance fifteen pounds pressure, and each of the devices or attachments A are normally rendered inoperative by the holding members therein so that the system will operate the same as if this attachment were not applied to the thermostat. Under these conditions the temperature of the room is dependent upon the position of the indicating arm 21 over the marked dial 22 shown in Fig. 5. At night time, however, when it is not desired to use many of the rooms, the air is supplied through the pipe 33 at, for example, one-half the normal pressure. This pressure is not sufficient for the secondary valve motor F to close the secondary valve E but it is great enough to permit the air to operate the primary valve motor C whereby the primary valve will be closed and consequently the heat will be shut off merely by the reducing of the pressure of the air. Should it be desired, however, to heat any particular room, all that is necessary is for the attendant to release the locking member of the attachment A indicated in Fig. 1 or the locking member of the device or attachment K indicated in Figs. 5 and 6 whereby it can assist the secondary motor to close and to hold closed the secondary valve. Under these conditions the thermostat can operate to control the temperature of the room by the opening and closing of the secondary valve E even though the pressure of the air supplied to the secondary valve motor has been reduced, and this without changing the position of the indicating arm relative to the marked dial.

If it is immaterial to the occupants whether or not the room be maintained at a uniform temperature, but at the same time be heated, all that will be necessary for the attendant to do will be to press or move the secondary valve E to closed position as by inserting a match or wedge between the swinging yoke or frame 1 and the main frame or backing 3 so that the free end of the yoke will be held in its outer position relative to the frame, thus maintaining the secondary valve, indicated as E' in Figs. 5 and 6, closed. This will permit the spring in the primary motor C to open the primary valve and the match or wedge will to a certain degree be the equivalent of the device or attachment A or K as to the feature of holding the secondary valve open.

While the radiators R are shown as being located directly within the different rooms still it is manifest that these radiators would be within the different rooms, within the sense of the present invention, if they were each located within a duct or air conduit for supplying air to the interior of the room heated indirectly by the radiator.

The improvements herein set forth are not limited to the precise construction and arrangement shown and described as they may be embodied in various forms and modifications without departing from the spirit and scope of the invention.

What I claim is:

1. A thermostatic temperature regulating apparatus comprising an air operated motor for operating a primary valve, a secondary valve mechanism controlling said motor, an air operated motor for operating said secondary valve, and a thermostatic valve controlling said second motor; said regulating apparatus having in combination with the secondary valve mechanism a device or attachment which is constructed and arranged so that it can be properly positioned whereby the secondary valve will be normally operated by its motor when the air supply to said motor is at a certain pressure and whereby, when desired, said device or attachment can be brought into operation so as to assist the secondary motor to operate the secondary valve when the air supply to said motor is at a different pressure.

2. A device or attachment for use in or in combination with a thermostat having a secondary valve and a motor for operating the same, said device or attachment comprising a body member, a lever pivoted thereto, a spring between the lever and body member for forcing the lever in a position to assist the motor in the operation of the secondary valve and locking means for holding the lever in a position where it cannot assist the motor in the operation of said valve.

3. An attachment for thermostats, said attachment comprising in combination a body, a lever pivoted thereupon, a spring between the body and lever and a locking member for holding the lever so that the spring will not operate the same.

4. An attachment for thermostats comprising a body member, a lever pivoted thereupon, a compression spring between one end of the lever and the body member and a lever locking member carried by the body member and arranged to engage the other end of the lever, the lever being also provided with a laterally extending lug for engaging a yoke of a thermostat.

5. A thermostat comprising an indicating arm, a dial, a secondary valve, a secondary valve motor, a sensitive thermostatic valve for controlling the operation of the secondary valve motor, which said sensitive valve is operatively related to the indicating arm, mechanism comprising a swinging yoke or member whereby the secondary valve can be operated by said motor, means arranged so as to engage said yoke or swinging member for assisting the motor in moving said swinging member and locking means arranged for holding said means which engage the yoke or swinging member from assisting in moving said yoke or swinging member.

6. A thermostat comprising a dial, an indicator arm, a sensitive thermostatic valve operatively connected to said arm and arranged to control the operation of a secondary motor, a secondary valve, mechanism comprising a yoke whereby the secondary motor can operate the secondary valve, a spring pressed lever arranged so that the spring by means of said lever can assist said motor in moving said secondary valve, and locking means for holding the lever in inoperative position.

7. The method of operating a heating system that comprises a plurality of radiators located in different rooms of a building, means for supplying a heating medium to said radiators, a primary valve for each radiator for controlling the flow of heating medium to said radiator, a primary valve motor connected to each primary valve, means for supplying air under pressure to said motor whereby the primary valve can be closed by said motor when the air supply to said motor is open, a secondary valve for regulating the flow of air to the primary motor, an air operated secondary motor connected with the air supply for the primary motor, and a sensitive thermostatic valve for controlling said secondary motor, which method comprises the maintaining of the air for operating said motors at a normal pressure when it is desired to heat practically all of the rooms in the building, the decreasing, when the rooms are not to be occupied, of the pressure of the air supplied to the motor below the normal such amount that the secondary motor cannot operate to move the secondary valve where it can vent the primary motor whereby the radiators in the rooms not desired to be occupied will be closed, and in pressing on the secondary valves that are in any rooms desired to be occupied during the period that the air pressure is thus decreased so as to cause the secondary valve to vent the primary motor should the temperature in the room drop below the desired degree.

8. A heating system comprising a plurality of radiators located in different rooms of a building, means for supplying a heating medium to said radiators, a primary valve for each radiator for controlling the flow of heating medium to said radiator, a primary valve motor connected to each primary valve, means for supplying air under pressure to said motor whereby the primary valve can be closed by said motor when the air supply to said motor is open, a secondary valve for regulating the flow of air to the primary motor and constructed so as to vent the latter, an air operated secondary valve motor connected with the air supply for the primary motor, a sensitive thermostatic valve for controlling the secondary motor, means whereby the air supplied to the motor will in the normal operation of the system be at one pressure but which will cause the pressure of air supplied to the motor to be decreased when the system is not in normal operation, and means for assisting in holding the secondary valve so that it can vent the primary motor when the pressure is thus decreased whereby the primary valve can open.

9. The method of operating a heating system having different radiators adapted to heat different rooms, a pressure-operated valve for controlling the flow of heating fluid to each radiator, a common source of motive fluid under pressure and a conduit leading from said source to each valve for supplying motive fluid thereto, each particular room thus heated having a thermostatic device coöperatively connected to the conduit leading to the pressure-operated valve controlling the particular radiator adapted to heat the particular room, which method consists at one time in supplying the motive fluid at a normal pressure from said common source and regulating by means of the thermostatic devices the condition within the several conduits, whereby said pressure-operated valves will control the radiators to maintain the desired temperature in the different rooms, and at another time in supplying motive fluid at such an abnormal pressure to said conduits that all said pressure-operated valves will shut off the supply of heating medium to the radiators, and in bringing into coöperative relationship with said system other means whereby only a desired member of the pressure-operated valves will be opened to permit heating the desired rooms, the rest of the pressure-operated valves still remaining closed.

10. A heating system having different radiators adapted to heat different rooms, a pressure-operated valve for each radiator for controlling the flow of heating fluid to its radiator, a pipe or conduit for each said valve and leading to each said valve from a common source of motive fluid supply, each room thus heated having a thermostatic device which is coöperatively connected to the pipe leading to the pressure-operated valve for the radiator that supplies heat to the particular room, the construction of the system being such that when motive fluid is supplied at a normal pressure from the source the thermostatic devices for the different rooms will each operate to vary the conditions within the pipes leading to the pressure-operated valves, thus automatically controlling the movements of the pressure-operated valves and thus regulating the temperature within each of the several rooms, said system being also provided with means which can be positioned so that when motive fluid is supplied at a certain abnormal pressure from said source of supply, a desired part of said pressure-operated valves will be automatically closed while the desired remainder of said pressure-operated valves will be open or will remain open to effect a heating of the rooms desired to be heated.

11. The method of operating a heating system that comprises several radiators, a primary valve connected to each radiator, a motor for operating each of said valves, a secondary valve for each primary valve motor for controlling the flow of operating fluid to said motor, a motor for each secondary valve, a thermostatic valve member for each secondary valve motor for controlling the operation thereof, and a device or attachment that can be adjusted or positioned so as to determine whether or not the secondary valve that is thus under the control of the thermostatic valve member will permit the flow of operating fluid under pressure to said primary valve motor whereby the primary valve will be opened to permit the flow of a heating medium to the radiator to which the primary valve is connected, which method comprises the positioning of certain of said devices or attachments and the supplying to said secondary valve motors of motor operating fluid or air at one pressure when a certain number of radiators are required for heating purposes, and the supplying of the air to said secondary valve motors at a different pressure when other radiators or when another combination of radiators are or is required for heating purposes.

12. The method of operating a heating system comprising several radiators, means for supplying a heating medium thereto, which means comprises a primary valve for each radiator for controlling the flow of heating medium thereto, a thermostatically controlled pressure operated motor for controlling the operation of each of said primary valves, means for supplying operating fluid to said motors, a thermostatic member for each of said motors, and means comprising a device or attachment which can be adjusted or positioned so as to determine whether or not the primary valve that is thus controlled by said thermostatically controlled pressure operated motor will permit the flow of heating medium to the radiator when the air for operating said motor has been changed to an abnormal pressure, which method comprises supplying motor operating air or fluid at a normal pressure to said thermostatically controlled motor when all of the radiators are to be utilized, and at an abnormal pressure to said thermostatically controlled motor when only a part of the radiators are to be utilized, a part of said devices or attachments being brought into operation and coöperating with a proper part or number of said motors whereby when the motor operating air or fluid is the abnormal pressure a desired part or number of the radiators will be automatically supplied with the heating medium at a time when the heating medium is shut off from the rest of the radiators.

13. A heating system having several radiators, a valve for each radiator for controlling the flow of heating medium thereto, and thermostatically controlled pressure-operated means for positioning each of said valves, the system being constructed so as to maintain a normal pressure when all of the radiators are to be automatically supplied with heating fluid and so as to maintain an abnormal pressure when only a part of said radiators are desired to be utilized, the construction also being such that a part of the radiators can be prevented from receiving the flow of the heating medium due to devices or attachments applied to said thermostatically controlled pressure-operated means whereby a part of the radiators can be supplied with heating fluid while the rest of the radiators are cut off.

14. A heating system comprising several radiators, a primary valve for each radiator, a motor for each primary valve, a thermostatic valve comprising a means for supplying air under pressure to said motors, said air supply means also being provided with a device and also constructed so that at normal pressure the primary valve will be automatically regulated to permit a flow of heating medium to the radiators and so that when said device is properly positioned only a part of the radiators will be supplied with heat while the rest of the radiators are cut off.

This specification signed and witnessed this 16th day of January, A. D. 1914.

JAMES F. GALLAGHER.

Signed in the presence of—
G. McGRANN,
D. HAROLD BUSH.